Nov. 9, 1937.                    R. A. TUOT                    2,098,363
RAILROAD SIGNALING DEVICE BASED UPON THE SPACING DUE TO THE SPEED
               Filed May 15, 1935          3 Sheets-Sheet 1

INVENTOR
RAYMOND A. TUOT
By Bönnelycke, Young, Emery & Thompson
ATTORNEYS

Nov. 9, 1937. R. A. TUOT 2,098,363
RAILROAD SIGNALING DEVICE BASED UPON THE SPACING DUE TO THE SPEED
Filed May 15, 1935 3 Sheets-Sheet 2

INVENTOR
RAYMOND A. TUOT
By Bönnelycke, Young, Emery & Thompson
ATTORNEYS

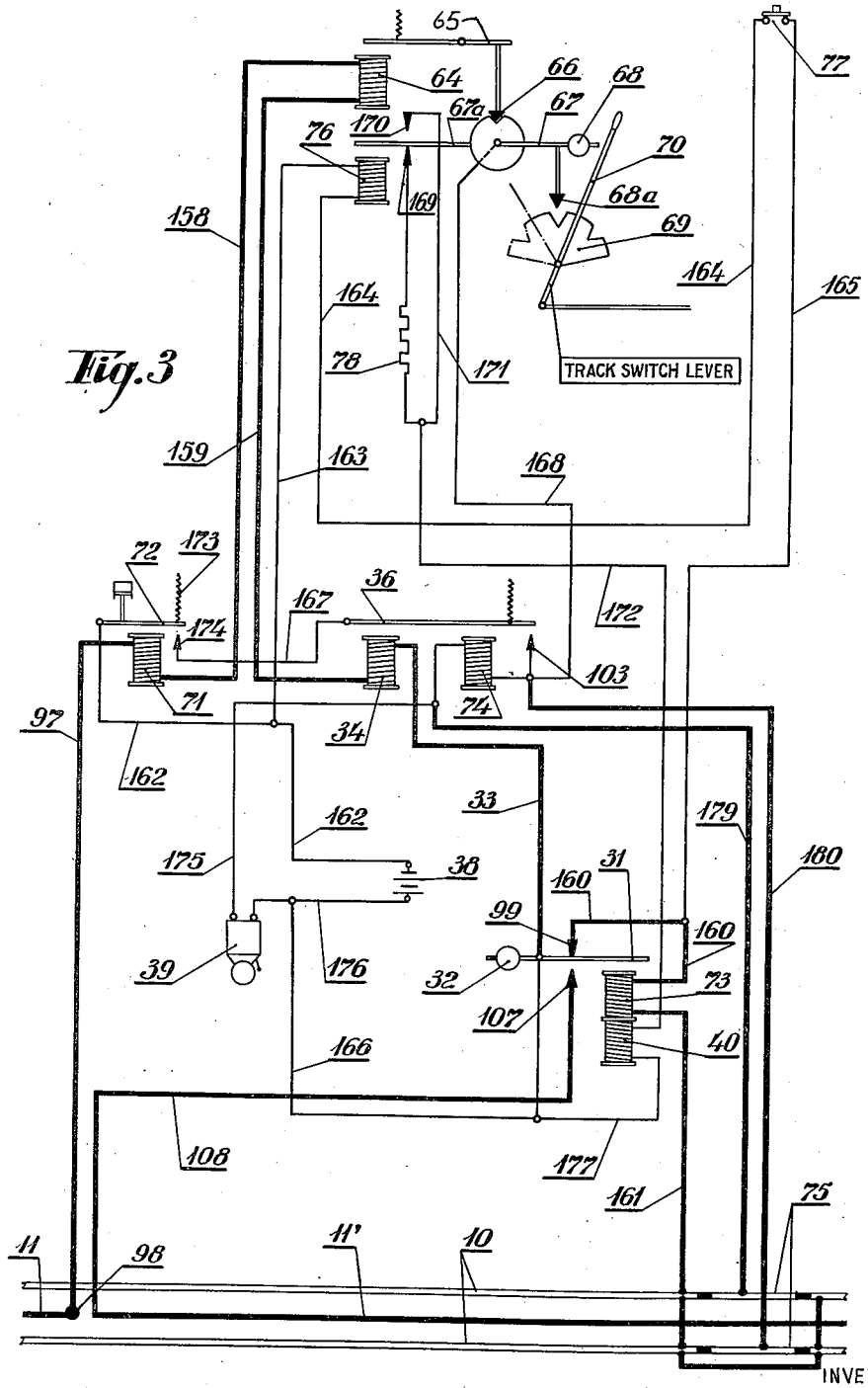

Patented Nov. 9, 1937

2,098,363

UNITED STATES PATENT OFFICE 2,098,363

RAILROAD SIGNALING DEVICE BASED UPON THE SPACING DUE TO THE SPEED

Raymond Arthur Tuot, Strasbourg, France, assignor to Société Auxiliaire d'Etudes Electrotechniques, Strasbourg, France Application May 15, 1935, Serial No. 21,617
In France August 18, 1934

5 Claims. (Cl. 246—67)

The present invention relates to a signaling device for use upon railroads, which is based upon a spacing according to speed, and in which the apparatus for signaling or for safety are mounted on the track or on the locomotives of the trains, and their operation depends not only upon the distance between each apparatus and any approaching train, but also upon the speed of this train.

The invention further relates to a selecting device which is mounted upon each locomotive and serves to protect the relays and the indicators on the locomotive against the effects due to the presence, in the rear of the train, of other trains or various track apparatus which have been already passed by.

In fact, it is evidently necessary that the engineer on the locomotive should be informed only of the position of the trains and track apparatus which are situated in front of him, and not of the position of those in the rear.

The invention is illustrated by way of example in the accompanying drawings:

Fig. 3 is a more complete diagram of a track apparatus operating in connection with a switch.

Figure 1:
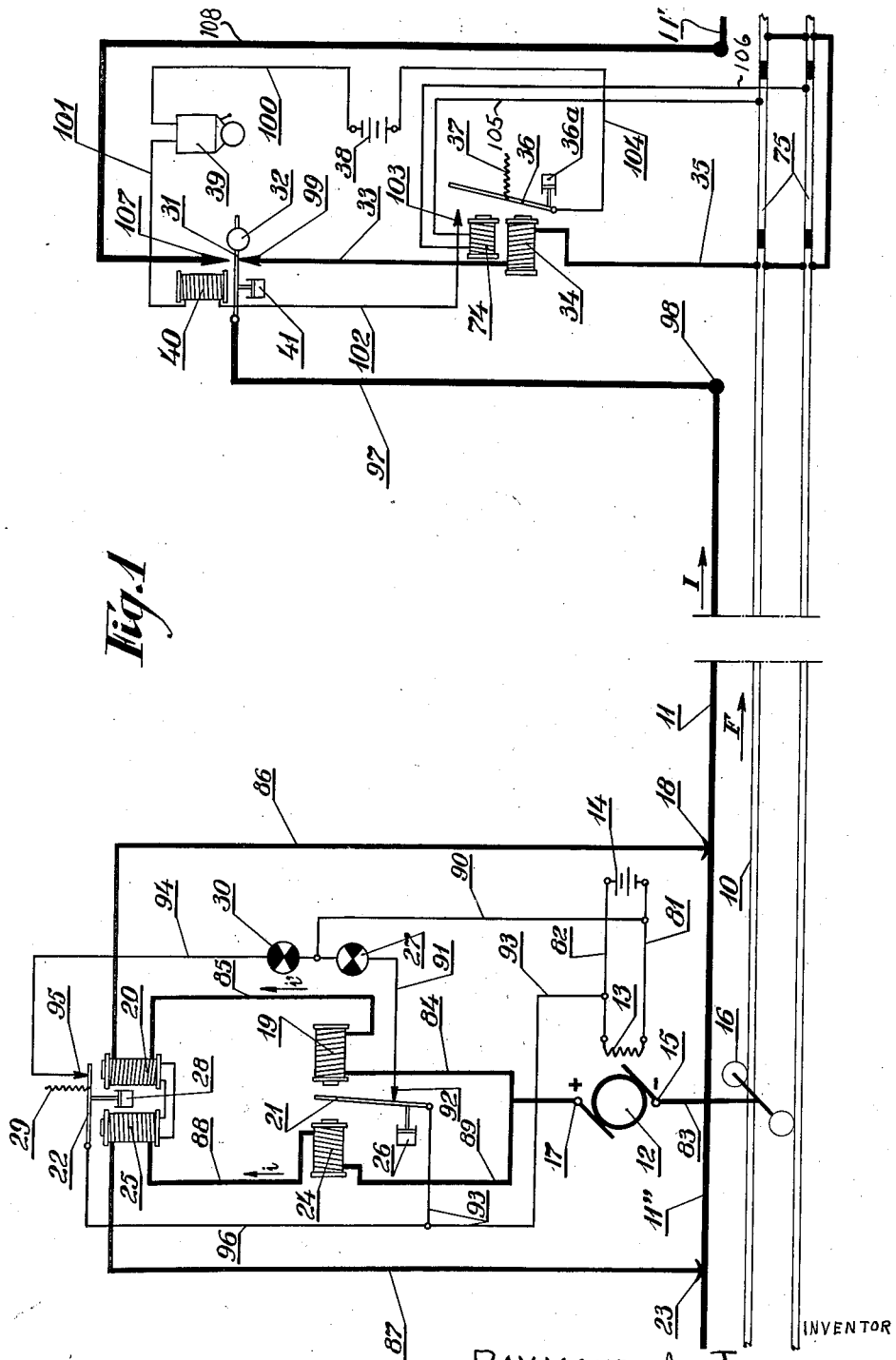
Fig. 1 is a simplified diagram of the circuits of a locomotive and of a track apparatus.

As shown in Fig. 1, 10 indicates the electric conductors which consist of the rails of railroad track and 11 is a pilot wire consisting of a conductor extending along the rails and insulated from the latter by means of suitable supports, not shown.

The material of the pilot wire 11 should resist wear and should have a high electrical resistance. Manganese steel is particularly recommended for this use.

Each locomotive traveling on the track is provided with an electric generator 12 of the direct current type which is separately excited at 13 by an auxiliary source of current 14, by means of two conductors 81 and 82.

One terminal 15 of the said generator, usually the negative terminal, is connected to the mass of the locomotive, and is thus connected to the rails 10 by means of the conductor 83 and the wheels 16 of the locomotive.

The positive terminal 17 of the said generator is connected in the first place to a sliding shoe 18 which is in constant contact with the pilot wire 11. This connection is made through a conductor 84, a winding 19, a conductor 85, a second winding 20 and a conductor 86; the windings 19 and 20 act respectively upon two armatures 21 and 22. The shoe 18 is mounted on the front of the locomotive, which is supposed to travel in the direction of the arrow F.

As far as possible from the shoe 18, and for instance at the rear end of the train or at the rear of the tender of the locomotive (in the case of steam traction) there is provided a second shoe 23, which is also in contact with the pilot wire 11. Thus a certain part 11'' of the pilot wire is located between the shoes 18 and 23. The shoe 23 is connected to the positive terminal 17 of the generator by a conductor 87, a winding 25, a conductor 88, a second winding 24 and a conductor 89.

The windings 24 and 25 act respectively upon the armatures 21 and 22 concurrently with the above-mentioned windings 19 and 20.

However, the winding 25 has a less number of turns than the winding 20. In like manner, means are taken so that the action of the winding 24 upon the armature 21 shall be less than the action of the winding 19.

The conductors of the windings 24 and 25 are wound in such direction that their action will be opposed to that of the windings 19 and 20, respectively.

However, the construction is such that the ohmic resistance of the part of the circuit comprising the terminal 17, the conductor 89, the winding 24, the conductor 88, the winding 25, the conductor 87 and the shoe 23, will be practically the same as the resistance of the part of the circuit comprising the terminal 17, the conductor 84, the winding 19, the conductor 85, the winding 20, the conductor 86 and the shoe 18, and this in spite of the difference between the number of turns of the windings 19—20 and 24—25.

The armature 21, which is attracted by the winding 19, is provided with a dash-pot 26, and this armature controls the opening and closing of the following circuit: source of current 14, conductor 90, indicator 27, conductor 91, contact 92, armature 21, conductor 93, conductor 82, and source of current 14. The indicator 27 may consist of a lamp or a disc.

The armature 22, which is common to the windings 20 and 25, is provided with a dash-pot 28 and a reaction spring 29, and it controls the opening and closing of the following circuit: source of current 14, conductor 90, indicator 30, conductor 94, contact-piece 95, armature 22, conductor 96, conductors 93 and 82, and source of current 14. The indicator 30 is preferably of the same kind as the indicator 27.

The pilot wire 11 extends along the track as far as the next important point 98, such as a station. At this point, the pilot wire is connected by a conductor 97 to a relay armature 31 which is controlled by a weight 32, and which, in the normal position shown in Fig. 1, rests upon a contact-piece 99 connected by a conductor 33 to a winding 34 of low resistance which is connected by a conductor 35 to the rails 10 of the track.

In this manner, the track apparatus usually connects the pilot wire section 11, to the rails 10 of the track.

The winding 34 acts upon an armature 36 which is provided with a dash-pot 36a and with a reaction spring 37, and when this armature is attracted, it closes a circuit comprising an auxiliary source of current 38, a conductor 100, an indicator 39, a conductor 101, a relay winding 40 acting upon the armature 31, a conductor 102, a winding 74, a contact-piece 103, the armature 36, a conductor 104, and the source of current 38. The winding 74 acts upon the armature 36, in the same way as the winding 34.

The track 10 comprises a double section of rails 75, which are electrically insulated from the rest of the track, and the two parts of this section are respectively connected to the terminals of the winding 74 by conductors 105 and 106, and thus any vehicle passing over the section 75 will place this winding in short-circuit.

The armature 31 is provided with a dash-pot 41, and when it is attracted by the winding 40, it separates from the contact-piece 99 and comes against a contact-piece 107 which is connected by a conductor 108 to the next section of pilot wire 11' which is situated beyond the track apparatus.

The operation of the above-mentioned simplified device is as follows.

When the locomotive travels upon the track 10 at a certain speed, the generator 12 produces a voltage proportional to this speed, and thus a current will flow in the following circuit; generator 12, terminal 15; conductor 83, mass of the locomotive, wheels 16, rails 10, conductor 35 of the next track apparatus, winding 34, conductor 33, contact-piece 99, armature 31, conductor 97, pilot wire 11, shoe 18; from this shoe, the circuit is divided into two branches:

First branch: shoe 18, conductor 86, winding 20, conductor 85, winding 19, conductor 84, terminal 17 and generator 12.

Second branch: shoe 18, portion 11'' of the pilot wire, shoe 23, conductor 87, winding 25, conductor 88 winding 24, conductor 89, terminal 17, and generator 12.

The value of the current supplied by the generator 12 will depend on the one hand upon the voltage of this generator, and on the other hand, upon the total resistance of the circuit. However, the principal part of this resistance consists of the pilot wire 11 located between the locomotive and the track apparatus 98, and as this resistance is proportional to the length of this pilot wire, it will be noted that all other factors being equal, the value of the current will depend upon the speed of the locomotive and the distance between this latter and the track apparatus.

In consequence, the current will be greater as the speed of the locomotive is greater, and as this locomotive is nearer the track apparatus, so that it will reach a value sufficient to excite the relay 34, for a position of the locomotive which is farther from the track apparatus according as the locomotive travels at a greater speed.

In this way, the coefficient of safety of the device is exactly proportional to the different speeds of the trains traveling on the track. In other words, the operating of the relay 34 takes place at a constant of time before the passage of trains, whatever be the speeds of these trains, and this constitutes one of the principal advantages of the device according to the invention.

Thus when the current in the winding 34 reaches the value for which the armature 36 is attracted, the following circuit will be closed: source of current 38, conductor 100, indicator 39, conductor 101 winding 40, conductor 102, winding 74, contact-piece 103, armature 36, conductor 104, and source of current 38.

The indicator 39 will now operate, thus showing the track man that a train is about to arrive. The winding 40 is also excited, and it attracts the armature 31, thus connecting the pilot wire 11 to the next section 11' through the following parts: conductor 97, armature 31, contact 107 and conductor 108.

Thus the current supplied by the generator 12 now circulates in the section 11', so that the resistance of the circuit is much increased and the value of the current is considerably reduced.

Since the armature 31 has left the contact-piece 99, no current now flows in the winding 34, but as the circuit of the winding 74 is closed, a current will flow in this latter, and thus the armature 36 remains in place. For the same reason, the winding 40 remains excited, and holds the armature 31 against the contact-piece 107.

Thus the locomotive can pass before the track apparatus without being obliged to reduce its speed.

When the train proceeds upon the section 75, the wheels 16 produce a short-circuit between the terminals of the winding 74; the armature 36 is no longer attracted, and by the action of its spring 37, it breaks the circuit of the indicator 39 and of the winding 40.

The indicator 39 ceases to operate, and the armature 31, which is no longer attracted by the winding 40, is brought back by the weight 32 and again rests upon the contact-piece 99, and thus the section 11 of the pilot wire is separated from the section 11' and is connected to the rails 10 by the following parts: conductor 97, armature 31, contact-piece 99, conductor 33, winding 34, and conductor 35.

Thus all the parts of the track apparatus will now be in the inoperative position which they occupied before the passage of the train.

If for any reason the armature 36 was not attracted, the current produced by the generator 12, part of which flows in the winding 20 of the locomotive, would have increased according as the locomotive came nearer the track apparatus, and it would have soon reached a value for which the winding 20 can attract the armature 22, thus breaking the circuit of the indicator 30 and showing the engineer that he should slow up the train.

This slowing should be continued until the armature 22 resumes its position, which if the track apparatus remains stationary will only take place when the locomotive and the generator have stopped just before the track apparatus.

If, however, the track apparatus operates in the meantime, the armature 22 returns to its initial position, and the slow-speed indicator 30 allows the engine driver to bring the train to the normal speed.

It may happen that between the locomotive and the track apparatus there is another locomotive traveling at a slower speed, and in this case the generators of the two locomotives will operate in parallel, and a certain current will flow from one to the other.

The value of this current is evidently proportional to the difference between the voltages produced by the generators 12 of the two locomotives, and inversely proportional to the ohmic resistance of the circuit, i. e. practically to the length of the pilot wire 11 comprised between the two locomotives.

In other words, the value of this current is proportional to the difference between the speeds of the trains, and inversely proportional to the distance between them.

If the front train should reduce its speed, the current flowing between the trains will cause the armature 22 to be attracted, and the indicator 30 will show the engineer of the rear train that he should reduce his speed.

The arrangement, on the locomotive, of the two shoes 18 and 23 and the two windings 20 and 25 serves to obtain the automatic selection of the current acting upon the armature 22.

The portion of the pilot wire 11'' between the shoes 18 and 23 has a certain resistance which can be indicated by R.

It may also be supposed, for the sake of simplicity, that the same ohmic resistance R pertains to each of the two following branches of the circuit;

First branch: shoe 18, conductor 86, winding 20, conductor 85, winding 19, conductor 84, terminal 17 of the generator 12.

Second branch: shoe 23, conductor 87, winding 25, conductor 88, winding 24, conductor 89, and terminal 17 of the generator 12.

If the current flows from the train to the track apparatus, due to the fact that this apparatus places the pilot wire in short-circuit with the rails of the track, it will be observed that the current I supplied by the generator 12 will be subdivided, in the two branches, into two currents one of which, $i$, flows in the winding 25 and the other, $i'$, flows in the winding 20.

If the current I is due to the presence of a short-circuit produced by a track apparatus situated in front, as shown in Fig. 1, the second branch of the circuit, which comprises the winding 25 and the shoe 23, will also comprise the part 11'' of the pilot wire which has a resistance R.

Hence in this case, this part of the circuit has a total resistance $R+R=2R$.

On the contrary, the branch of the circuit which comprises the winding 20 has only a resistance whose value is R.

This will give:

$$Ri'=2Ri$$

$$i'=2i$$

In this way, the current $i$ flowing in the winding 25 possesses, in the case of Fig. 1, a value equal to half the value of the current $i'$ flowing in the winding 20.

As on the other hand, the winding 20 has a greater number of turns than the winding 25, it will evidently have a preponderating action upon the armature 22, and the device will act as in the preceding case.

If, on the contrary, the short-circuit is located in the rear of the locomotive, for instance owing to the presence of another train, it will be noted that the portion 11'' of the pilot wire situated between the shoes 18 and 23 carries the current $i'$ which flows in the winding 20.

In this case, it is evident that there will be the following relation between the currents:

$$i=2i'$$

If it be supposed that the number of turns of the winding 20 is double that of the winding 25, it will be noted that the number of ampere-turns in the two windings are equal, and as these windings are in opposition, the resulting induction will be nil, and the armature 22 remains in position. It will be observed from the preceding considerations that the indicator 30 can only operate on account of what takes place in front of the train, as shown in Fig. 1, and not in the rear of this train.

The armature 21 forms a safety relay adapted for action on minimum current. During the normal working this armature is attracted by the winding 19, which always carries a certain proportion $i'$ of the current, and the circuit of the indicator 27 is closed; but if the current in the winding 19 should be reduced to an excessive degree, for instance owing to an accidental break of the circuit, the armature 21 will be no longer attracted, hence leaving the contact piece 92 and opening the circuit of the indicator 27, thus showing the engineer that the device has been put out of use.

The diagram shown in Fig. 1 is greatly simplified, for the better understanding of the principal characteristics of the invention, but it is obvious that the actual outfit of a locomotive is much more complicated, as it comprises numerous devices for mutual control, adapted to provide all the safety in the operating which is indispensable.

Figure 2:
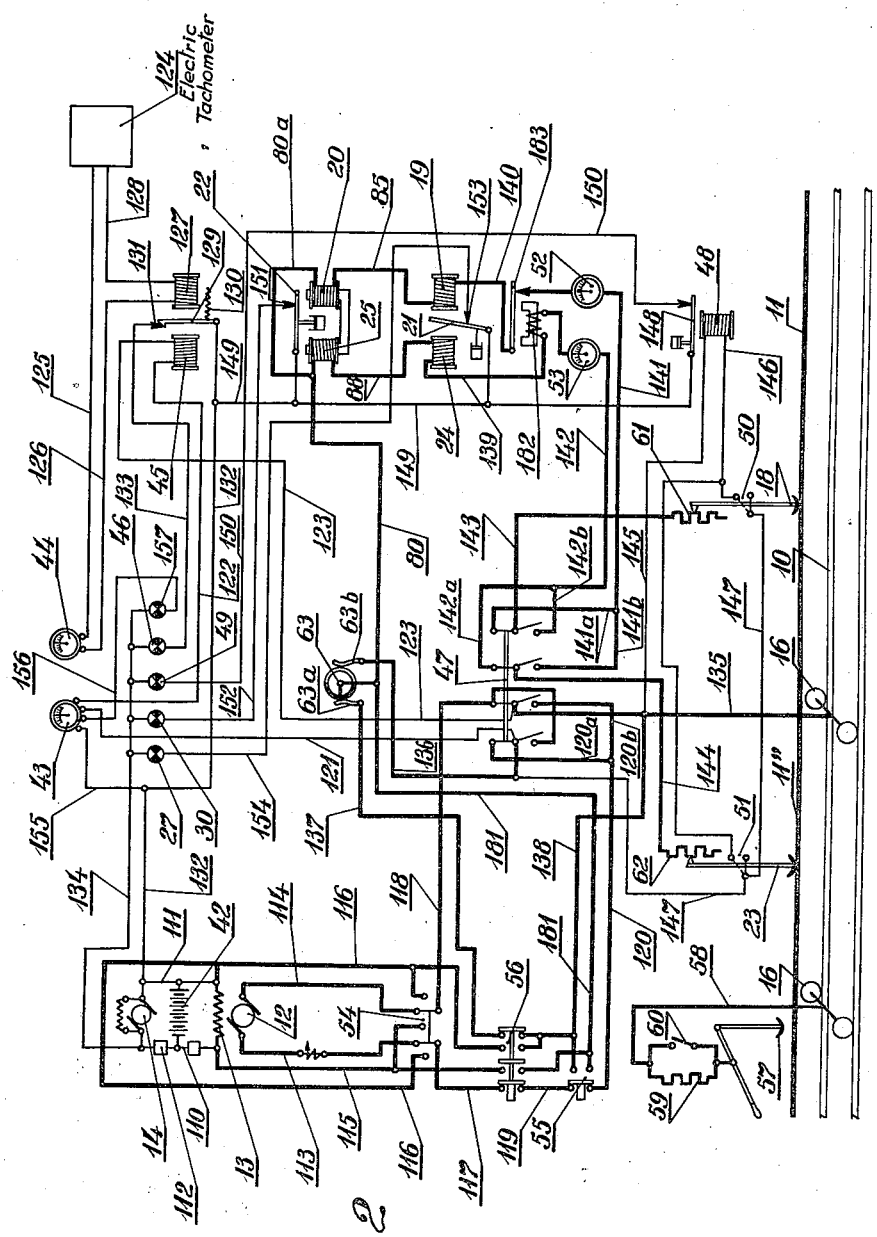
Fig. 2 is a more complete diagram of the equipment of a locomotive.

An example of the outfit of a locomotive is shown in Fig. 2, in which the arrangement already described with reference to Fig. 1 will be recognized.

The same reference figures relate to like apparatus shown in Fig. 1.

The exciting winding 13 of the generator 12 is supplied by an exciter 14 by means of two conductors 110 and 111. A storage battery 42 is mounted in shunt on the conductors 110 and 111, so as to be able, if necessary, to make up for any failure of the said exciter.

An automatic switch 112 is connected in the line 110 so as to prevent the said battery from accidentally discharging into the windings of the exciter 14.

The said exciter 14 is of the type having a constant voltage, i. e. its voltage will not practically vary, even though the speed should be variable.

The generator 12 is connected by conductors 113 and 114 to two respective contact-pieces of a switch 54 having five contact-pieces, over which are movable, two brushes which are coupled together.

The other three contact-pieces of the said switch are connected, after the manner of a reversing switch, to conductor 115 and 116, leading respectively from the conductors 110 and 111.

The movable brushes of the switch 54 are connected to two conductors 117 and 118. In this way, according to the position of the said brushes, the conductors 117 and 118 can be connected either to the terminals of the generator 12 (as in Fig. 2), or to the terminals of the exciter 14, and in this latter case, the poles can be reversed.

When the conductors 117 and 118 are thus connected to the terminals of the exciter 14 the current flowing in them is independent of the speed of the locomotive. Thus the device will no longer operate under normal conditions, and the engineer must now run at reduced speed in order to avoid accidents.

The conductor 117 leads to one of the contact-pieces of a push-switch 56 whose movable part connects this conductor to a conductor 119 which is connected to a second push-switch 55.

In the position shown in Fig. 2, the switch 55 connects the conductor 119 to a conductor 120 which is subdivided into two branches 120a and 120b which are connected to two respective contact-pieces of a multi-polar reversing switch 47.

In like manner, the conductor 118 is connected to two oppositely-situated contact-pieces of the reversing switch 47. In this manner, the two corresponding brushes of the said reversing switch may, according to their position, be connected to either terminal of the generator 12.

By the use of the reversing switch, the locomotive can be operated on forward or back drive, without changing the polarity of the brushes of the reversing switch.

These two brushes of the reversing switch 47 are connected in a circuit comprising a conductor 121, a voltmeter 43, a conductor 122, a winding 45 and a conductor 123.

The voltmeter 43 may be graduated in volts and also miles per hour, as the voltage of the said generator is proportional to the speed.

The locomotive is provided with an electric tachometer 124 of any suitable type. This tachometer is connected in a circuit comprising a conductor 125, a voltmeter 44 graduated in miles an hour, a conductor 126, a winding 127 and a conductor 128.

The windings 45 and 127 act in opposition upon the same armature 129 which is returned by a spring 130 which is so designed that the armature will remain upon a contact-piece 131 as long as the current supplying the voltmeter 43 will give it the same reading as that of the voltmeter 44 supplied by the tachometer 124, but if on account of an accident of any kind, the currents in the voltmeters 43 and 44 no longer show equal indications, the armature 129, which is urged by the spring 130 and by the winding 127, will separate from the contact piece 131.

However, the armature 129 and the contact-piece 131, are connected in the following circuit: exciter 14, conductor 132, armature 129, contact-piece 131, conductor 133, indicator 46, conductor 134, and exciter 14.

Thus in the case above mentioned, if the armature 129 leaves the contact-piece 131, the aforesaid circuit is broken and the indicator 46 warns the engineer of the locomotive.

The movable brush of the reversing switch 47, which is connected to the conductor 123, is also connected by a conductor 135 to the mass of the locomotive, i. e. to the wheels 16 and the track rails 10.

The other movable brush of the reversing switch 47 which is connected to the conductor 121, is also connected, by a conductor 136, to the stationary brush 63b of a commutator 63 which rotates at a speed proportional to the speed of the generator 12 and cooperates with a second stationary brush 63a.

The brush 63a is connected by a conductor 137 to one of the contact-pieces of the push-switch 56. In the position shown in Fig. 2, a connection is thus made with a conductor 138, which is in permanent connection with the conductor 135 and with the body of the locomotive.

As concerns the switch 63 itself, this is connected by a conductor 80 to windings 25 and 20, resembling the ones shown in Fig. 1. The said windings are respectively connected by conductors 88 and 85 to windings 24 and 19, which are connected by conductors 139 and 140 to connecters 53 and 52, respectively.

In the circuit of the conductor 139 is mounted a relay winding 182 whose conducting armature 183 is mounted in the circuit of the conductor 140.

The said relay winding and armature are so arranged as to break the circuit between the winding 19 and the ammeter 52, when the current in the conductor 139 falls to a zero value, in the case of an accidental breaking of the portion of the circuit which comprises the winding 25.

In front of the ammeter 52, the circuit comprises a conductor 141 which is divided into two parts 141a and 141b, leading to two respective contact-pieces of the multipolar reversing switch 47. The ammeter 53 is connected to a conductor 142 divided into two parts 142a—142b, connected to two respective contact pieces of the reversing switch 47 which are situated opposite the aforementioned contact pieces.

These four contact-pieces cooperate with two movable brushes of the reversing switch 47; one brush is connected by a conductor 143 to a variable resistance 61 connected to the shoe 18 in contact with the pilot wire 11; the other brush of the reversing switch 47 is connected by a conductor 144 to a resistance 62 connected to the shoe 23.

The resistances 61 and 62 permit of regulating, to a suitable value, the ohmic resistances in the two parts of the circuit comprising the shoes 18 and 23.

The arrangement further comprises a relay 48 controlling an indicator 49 for slow speed, said relay being mounted in a circuit comprising switches 50 and 51, whose movable contact blades are actuated by the shoes 18 and 23. When these shoes rise by passing over inclined parts which are formed in various places on the pilot wire for this purpose, where it is necessary to slow up all of the trains, for instance at the beginning of a curve, the following circuit is closed: conductor 135 (body), conductor 145, winding 48, conductor 146, switch 50 or 51, conductor 147 and conductor 136 of the aforesaid circuit leading from the generator 12.

In this manner, the winding 48 is excited, and it attracts its armature 148.

The said armature is connected in the following circuit: exciter 14, conductor 132, conductor 149, armature 148, conductor 150, slow-speed indicator 49, conductor 134 and exciter 14. It will result from the preceding that when one or the other of the shoes 18—23 is raised, this will operate the slow-speed indicator 49, thus showing the engineer that he should slow up his train.

In the same way as for Fig. 1, the armature 22, which is acted upon by the windings 20 and 25, controls the operation of the indicator 30. For this purpose, the following circuit is formed: exciter 14, conductor 132, conductor 149, armature 22, contact piece 151, conductor 152, indicator 30, conductor 134 and exciter 14.

As in the case of Fig. 1, this circuit is broken when the armature 22 is attracted by the winding 20 or 25 and leaves its contact-piece 151.

For the armature 21, which is controlled by the windings 19 and 24, the following circuit is provided: exciter 14, conductors 132 and 149, armature 21, contact-piece 153, conductor 154, indicator 27, conductor 134, and exciter 14. This circuit operates in the same conditions as the corresponding circuit described with reference to Fig. 1.

The voltmeter 43 is provided with two other conductors 155 and 156; the conductor 155 is connected to the conductor 132, and the conductor 156 leads to an indicator 157 which is also connected to the conductor 134.

In the interior of the voltmeter 43, the conductors 155 and 156 are connected to a contact device of such construction that if for any reason the voltmeter pointer should come to the zero of the scale, the following circuit will be closed: exciter 14, conductor 132, conductor 155, voltmeter contact device 43, conductor 156, indicator 157, conductor 134, and exciter 14.

It will result from this arrangement that if the voltage of the generator 12 is reduced to zero, the above-mentioned circuit will be closed, and the indicator 157 will operate in order to attract the attention of the engineer of the locomotive.

The ammeters 52 and 53 may be provided with contact-pieces at the end of the movement of their pointers, in order to operate a signal device (not shown) when the current exceeds a given value.

The above-mentioned push-button 55 comprises two other contact-pieces, whereof one is connected to the conductor 138 (body of the locomotive), and the other is connected by a conductor 181 to the circular switch 63.

By means of this arrangement, when the engineer presses the push-button 55, he removes the generator 12 and the exciter 14 from the circuit, and closes this circuit upon itself. Thus when the signal device 30 operates, the engineer can observe whether this operation is due to a stationary track apparatus (or to a stopped train) or to a moving train. In fact, in this latter case, the said signal device will continue to operate.

The push-button 56 also possesses other contact pieces than the ones above described. These other contact pieces are respectively connected on the one hand to the conductors 115 and 116 leading from the exciter 14, and on the other hand to the conductors 138 and 181. Thus when the engineer presses the said push-button 56, he places the exciter 14 in circuit, temporarily removing the generator 12. This button should be used by the engineer after the signal device 30 has obliged him to stop the train, and thus he can be informed as soon as the short-circuit which caused this stopping has disappeared, and as soon as the locomotive can be again set running.

The locomotive is further provided with a safety shoe 57 under manual control, which is connected to the body of the locomotive through a resistance 59 and a conductor 58. The resistance 59 can be short-circuited at will by a switch 60.

By bringing the shoe 57 into contact with the pilot wire, the engineer can make a short-circuit between the pilot wire and the track, and thus, in the case in which the equipment of the locomotive is out of order all approaching trains are warned of the presence of the locomotive, so that all risk of accident is avoided. When the movable contact-piece of the circular switch 63 is in contact with the stationary brush 63b, the following circuit is closed: generator 12, conductor 113, switch 54, conductor 117, push-button 56, conductor 119, push-button 55, conductor 120, reversing switch 47, brush 63b, movable contact-piece 63, conductor 80, windings 20—25, conductors 85—88, windings 19—24, conductors 140—139, ammeters 52—53, conductors 141—142, reversing switch 47, conductors 143—144, resistances 61—62, shoes 18—23, pilot wire 11—11', track apparatus, rails 10, wheels 16 (locomotive body), conductor 135, reversing switch 47, conductor 118, switch 54, conductor 114, and generator 12.

This will provide the same operating conditions as in the case of Fig. 1.

When the movable contact-piece of the switch 63 is in contact with the brush 63a, as shown in Fig. 2, the following circuit is closed: rails 10, wheels 16 (locomotive body), conductors 135—138, push-button 56, conductor 137, brush 63a, movable contact-piece 63, conductor 80, windings 20—25, conductors 85—88, windings 19—24, conductors 140—139, ammeters 52—53, conductors 141—142, reversing switch 47, conductors 143—144, resistances 61—62, shoes 18—23, pilot wire 11—11", circuit of a train situated in the rear of the locomotive, and rails 10.

In this position of the contact-piece 63, the pilot wire is thus placed almost in short-circuit with the rails, and with respect to a train which is approaching in the rear, the locomotive acts as a veritable track apparatus, and the engineer of this rear train is thus warned of the presence of the locomotive.

When two trains or locomotives are running on the same track at practically the same speed, the voltages of their generators 12 are substantially equal, and thus if the rotary switch 63 were not used, it might happen that the current flowing will be very small, and that the trains will gradually approach each other without giving mutual signals.

The use of the circular switch eliminates this drawback.

Fig. 3 shows the diagram of a track apparatus employed with a track switch.

This figure comprises the greater number of the parts already described for the track apparatus shown in Fig. 1, and these parts are indicated by the same reference figures.

In the present case, the pilot wire 11 is extended by the conductor 97 which now leads to a winding 71 which is connected by a conductor 158 to a winding 64. The latter is connected by a conductor 159 to the winding 34, whose use was set forth with reference to Fig. 1.

The conductor 33 connects the winding 34 to the armature 31 which comes against a contact-piece 99 under the action of a counterweight 32. The contact-piece 99 is connected to a conductor 160 leading to a winding 73 which is also connected, by a conductor 161, to the track rails 10.

The winding 64 cooperates with an armature 65 controlling an arm 66 which is adapted for the locking or the release of a catch 67 which is urged by a weight 68 and acts by a tooth 68a upon a notched sector 69 secured to the switch lever 70.

The winding 71 has a low resistance, and it controls an armature 72 which is urged by a spring 173 and is mounted in series with the armature 36 in the circuit of the indicator 39.

This circuit now comprises the following parts: source of current 38, conductor 162, armature 72, contact 174, conductor 167, armature 36, contact 103, winding 74, conductor 175, indicator 39, conductor 176, and source of current 38.

The winding 71 is determined in such way that it will attract its armature 72 for a current of $I_0$ which is less than the value $I_1$ required to allow the winding 34 to attract the armature 36.

This armature 36, cooperating with the winding 34, is also controlled by the winding 74.

As to the winding 73, it acts upon the armature 31 above described, concurrently with a auxiliary winding 40.

The catch 67 is secured to the armature 67a of a winding 76 which is mounted in the following circuit: source of current 38, conductor 162, conductor 163, winding 76, conductor 164, push-button 77, conductor 165, conductor 160, contact-piece 99, armature 31, conductor 166, conductor 176, and source of current 38.

A circuit is provided for the supply of the auxiliary winding 40. This circuit, which has parts in common with the preceding, is thus composed: source of current 38, conductor 162, armature 72, contact-piece 174, conductor 167, armature 36, contact-piece 103, conductor 168, armature 67a, contact-piece 169 or 170, resistance 78 or conductor 171, conductor 172, windings 40, conductors 177, 166 and 176, and source of current 38.

Thus the armature 67a is mounted in such manner that the position in which the catch 67 comes into action, corresponds to the disconnecting of the resistance 78 due to the movement of the armature 67a towards its upper contact piece 170.

Upon the track 10 is located the double insulated section 75 which already appeared in Fig. 1, and whose parts are respectively connected to the ends of the winding 74 by conductors 179 and 180, so that any vehicle passing over the section 75 will place this winding in short-circuit.

The operation of this installation is as follows:

When the current in the pilot wire 11 reaches a determined value $I_0$, the armature 72 is attracted, but nothing else takes place. According as the train approaches, the current progressively increases, and when it reaches the determined value $I_1$, the armature 36 is attracted and closes the circuit of the indicator 39, which then comes into action.

The circuit of the auxiliary winding 40 comprises the resistance 78, whose value is such that the action of the winding 40 is not sufficient to maintain the armature 31; this armature is only subjected to the winding 73, and it then vibrates like a buzzer.

However, as the train still approaches, the current soon reaches a determined value $I_2$ which shows that it is necessary to lock the track switch.

At this time, the winding 64 attracts the armature 65, thus releasing the catch 66—67, so that the tooth 68a will drop into one of the notches of the sector 69 by the action of the weight 68.

By this movement of the catch, the armature 67a meets the contact-piece 170, and the resistance 78 is disconnected from the circuit, so that the current flowing in the circuit of the auxiliary winding 40 increases, and this winding is now sufficiently excited; it thus holds the armature 31 in the stationary position, hence connecting the sections 11 and 11' of the pilot wire, and allowing the train to continue its free movement on the track.

If the track switch had been in an irregular position, the tooth 68a would not have been able to drop into any of the notches of the sector 69, and the resistance 78 would have remained in the circuit, and thus the armature 31 would have continued to vibrate, and the engineer on the train would have been warned that it was necessary to slow up.

After the train has passed, the switchman acts upon the push-button 77, thus closing the circuit of the winding 76; the armature 67a of the catch 67 is now attracted, and the tooth 68a releases the sector 69, so that the switch can now be operated.

It is evident that what has been above stated with reference to a switch, is applicable to the gates of a grade-crossing, or to any other apparatus.

When the train passes over the section 75, the winding 74 is short-circuited; the armature 36 is released, and all the parts return to their initial position, ready to receive the next train.

The present example of track apparatus shows that the device in conformity to the invention is perfectly adapted to all conditions of signal operation and of safety which may be required upon railroads.

I claim:

1. A signaling system for trains on railroads, comprising an electric generator with constant field on a train, said generator being driven in dependence on train speed, a connection from one terminal of the generator to ground through the wheels of the train, a sectionalized pilot wire of high resistance extending parallel to the rails, a shoe on the train contacting said pilot wire, track apparatus between consecutive sections of the pilot wire and comprising a contact device normally grounding the end of the pilot wire section contacting said shoe and operable upon sufficient increase of current in said section to connect the latter to the next section, an indicator on said train, a connection from the second terminal of the train generator to said shoe, and current responsive means in said connection for operating the indicator.

2. A signaling system for trains on railroads, comprising an electric generator with constant field on a train, said generator being driven in dependence on train speed, a connection from one terminal of the generator to ground through the wheels of the train, a pilot wire extending parallel to the rails, a pair of shoes on the train contacting said pilot wire at spaced points, a connection from the second terminal of the train generator having branches leading separately to the two shoes, current relays in each branch, and signal devices operated by said relays, the total ohmic resistance of said relays being approximately equal to that of the length of pilot wire between the shoes, in order that one or the other of the relays will act in a preponderating manner according to whether the current comes from the front or the rear of the train.

3. A signaling system for trains on railroads, comprising an electric generator with constant field on a train, said generator being driven in dependence on train speed, a connection from one terminal of the generator to ground through the wheels of the train, a pilot wire extending parallel to the rails, a pair of shoes on the train contacting said pilot wire at spaced points, a connection from the second terminal of the train generator having branches leading separately to the two shoes, current relays in each branch, and signal devices operated by said relays, the total ohmic resistance of said relays being approximately equal to that of the length of pilot wire between the shoes and the relays in the two branches being substantially equal in resistance but having different ampere turns, in order that one or the other of the relays will act in a preponderating manner according to whether the current comes from the front or the rear of the train.

4. A signaling system for trains on railroads, comprising an electric generator with constant field on a train, said generator being driven in dependence on train speed, a connection from one terminal of the generator to ground through the wheels of the train, a pilot wire extending parallel to the rails, a pair of shoes on the train contacting said pilot wire at spaced points, a connection from the second terminal of the train generator having branches leading separately to the two shoes, current relays each having a pair of differential windings operative on its armature and arranged with their opposing windings in different branches of said connection, the total ohmic resistance of said relays being approximately equal to that of the length of pilot wire between the shoes and the relays in the two respective branches being substantially equal in resistance but having different ampere turns, in order that one or the other of the relays will act in a preponderating manner according to whether the current comes from the front or the rear of the train.

5. A signaling device for trains on railroads, comprising an electric generator with constant field, said generator being driven in dependence on train speed, a connection from one terminal of the generator to ground through the wheels of the train, a resistant pilot wire extending parallel to the rails, a pair of shoes on the train contacting said pilot wire at spaced points, a switch rotating in proportion to the speed of the generator, a connection between a brush of the switch and the other terminal of the generator, a connection between another brush of the switch and the ground, and a connection issuing from the rotating member of the switch and comprising two branches leading respectively to the shoes, so that the switch connects the pair of shoes alternately with the terminal of the generator and with the ground.

RAYMOND ARTHUR TUOT.